US012674427B2

(12) United States Patent
Hattori et al.

(10) Patent No.: US 12,674,427 B2
(45) Date of Patent: Jul. 7, 2026

(54) CONTROLLER FOR INTERNAL COMBUSTION ENGINE

(71) Applicant: TOYOTA JIDOSHA KABUSHIKI KAISHA, Toyota (JP)

(72) Inventors: Tatsunobu Hattori, Seto (JP); Yutaro Kitano, Toyota (JP); Ryota Iwasaki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/189,153

(22) Filed: Apr. 24, 2025

(65) Prior Publication Data

US 2025/0369399 A1 Dec. 4, 2025

(30) Foreign Application Priority Data

Jun. 4, 2024 (JP) ................................ 2024-090700

(51) Int. Cl.
*F02D 19/02* (2006.01)
*F02M 21/02* (2006.01)

(52) U.S. Cl.
CPC ....... *F02D 19/027* (2013.01); *F02M 21/0242* (2013.01); *F02D 2200/0602* (2013.01)

(58) Field of Classification Search
CPC ........... F02D 19/027; F02D 2200/0602; F02D 19/022; F02D 19/025; F02D 41/0027; F02D 41/042; F02M 21/0242
See application file for complete search history.

(56) References Cited

U.S. PATENT DOCUMENTS

| | | | | |
|---|---|---|---|---|
| 6,427,670 | B2 * | 8/2002 | Goto | F02D 19/022 123/529 |
| 6,467,466 | B1 | 10/2002 | Maekawa et al. | |
| 9,816,891 | B2 * | 11/2017 | Ishida | F23N 5/242 |
| 2001/0032628 | A1 * | 10/2001 | Goto | F02M 21/0242 123/529 |

FOREIGN PATENT DOCUMENTS

| | | | | |
|---|---|---|---|---|
| DE | 102004005027 | A1 * | 8/2005 | G01M 3/2815 |
| DE | 102005048456 | A1 * | 4/2007 | F02D 19/027 |
| EP | 1691063 | A2 * | 8/2006 | F02M 21/0275 |
| JP | 08093566 | A * | 4/1996 | |
| JP | 2001041106 | A | 2/2001 | |
| JP | 2001090615 | A * | 4/2001 | |
| JP | 2005207363 | A * | 8/2005 | |
| JP | 2007064032 | A | 3/2007 | |
| JP | 2012067832 | A * | 4/2012 | |

* cited by examiner

*Primary Examiner* — Hung Q Nguyen

(57) ABSTRACT

An internal combustion engine includes a fuel tank, a fuel injection valve, a fuel passage, a shut-off valve disposed in the fuel passage, and a pressure sensor that detects a passage fuel pressure that is a pressure of fuel in a portion of the fuel passage between the shut-off valve and the fuel injection valve. The controller outputs a valve closing signal to the shut-off valve, and executes a determination process of determining whether the shut-off valve is stuck open based on a decrease amount of the passage fuel pressure that occurs until an elapsed period after the valve closing signal is output reaches a predetermined specified period. The controller excludes, from the elapsed period, a period in which a fuel cutoff process for stopping fuel injection by the fuel injection valve during operation of the internal combustion engine is executed.

4 Claims, 2 Drawing Sheets

CONTROLLER FOR INTERNAL COMBUSTION ENGINE

CROSS-REFERENCE TO RELATED APPLICATIONS

This application is based upon and claims the benefit of priority from Japanese Patent Application No. 2024-090700, filed on Jun. 4, 2024, the entire contents of which are incorporated herein by reference.

BACKGROUND

1. Field

The present disclosure relates to a controller for an internal combustion engine.

2. Description of Related Art

Japanese Laid-Open Patent Publication No. 2001-041106 discloses an internal combustion engine that uses gaseous fuel. A shut-off valve is disposed in a fuel passage of the internal combustion engine. While the internal combustion engine is in a stopped state, the shut-off valve is closed, thereby stopping the supply of fuel from the fuel tank to the fuel injection valves.

One method of determining whether the shut-off valve is stuck open involves issuing a closing command to the shut-off valve during fuel injection and then monitoring changes in the fuel pressure between the shut-off valve and the fuel injection valves in the fuel passage (hereinafter, referred to as "passage fuel pressure"). If the shut-off valve is closed, the amount of fuel in the fuel passage decreases as the fuel injection is performed, and thus the passage fuel pressure decreases. If the shut-off valve is stuck open, fuel continues to be supplied from the fuel tank to the fuel injection valves. As a result, even during fuel injection, the passage fuel pressure is unlikely decrease. Therefore, a determination can be made that the shut-off valve is stuck open based on a small decrease in the passage fuel pressure.

In some cases, a fuel cutoff process is executed during operation of an internal combustion engine to temporarily stop fuel injection. During the fuel cutoff process, the passage fuel pressure does not decrease due to the fuel injection. Therefore, if the above-described method of determining whether a shutoff valve is stuck open is executed during the fuel cutoff process, it may be erroneously determined that a stuck-open state has occurred.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for an internal combustion engine mounted on a vehicle is provided. The internal combustion engine includes a fuel tank storing gaseous fuel, a fuel injection valve supplying the fuel into a cylinder, a fuel passage connecting the fuel tank to the fuel injection valve, a shut-off valve disposed in the fuel passage, and a pressure sensor disposed in a portion of the fuel passage between the shut-off valve and the fuel injection valve and configured to detect a passage fuel pressure that is a pressure of the fuel in the portion. The controller includes processing circuitry. The processing circuitry is configured to output a valve closing signal to the shut-off valve, execute a determination process of determining whether the shut-off valve is stuck open based on a decrease amount of the passage fuel pressure that occurs until an elapsed period after the valve closing signal is output reaches a predetermined specified period, and exclude, from the elapsed period, a period in which a fuel cutoff process for stopping fuel injection by the fuel injection valve during operation of the internal combustion engine is executed.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller for an internal combustion engine according to an embodiment will now be described with reference to FIGS. 1 and 2.

Figure 1:
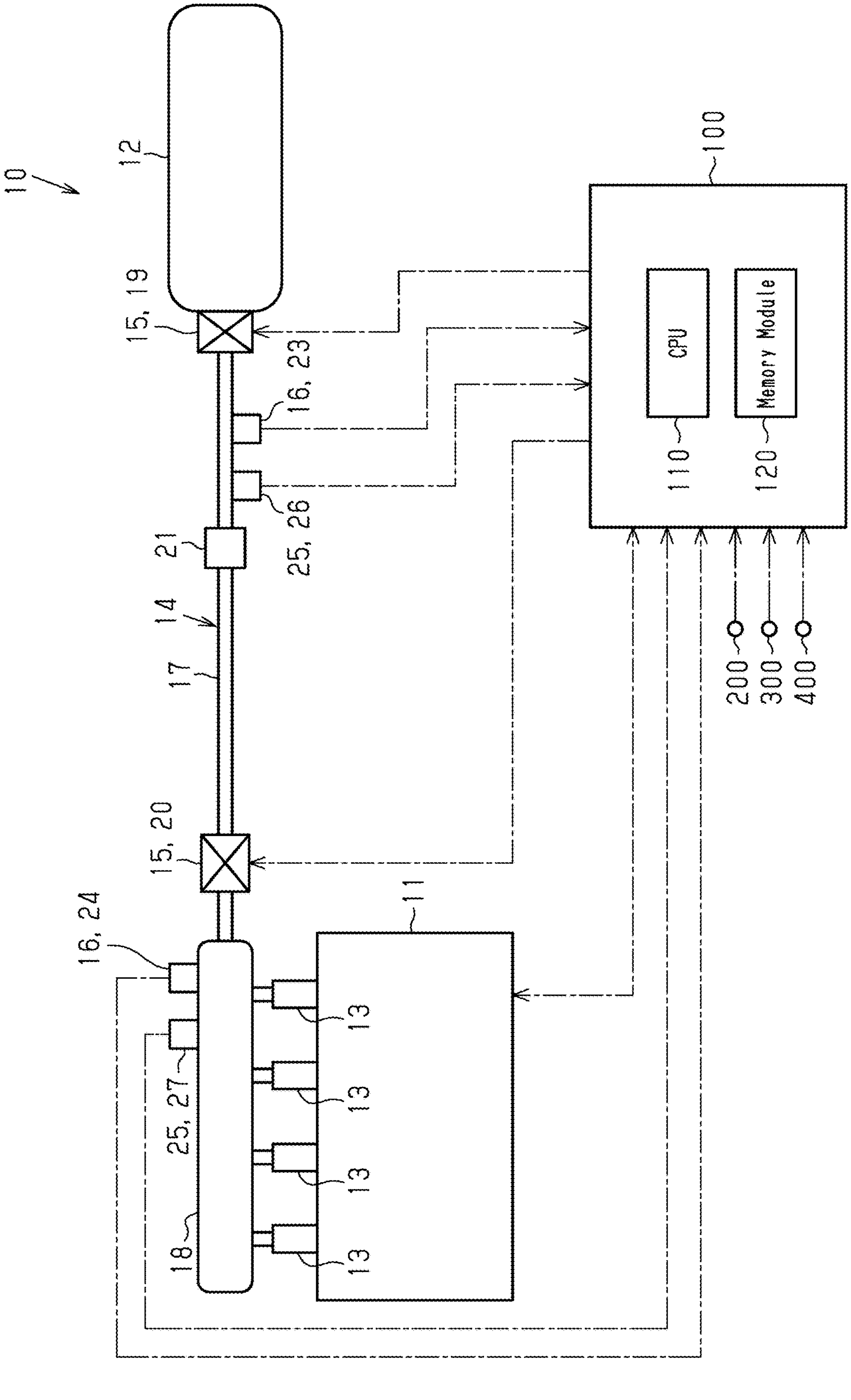
FIG. 1 is a schematic diagram showing an internal combustion engine and a controller for the internal combustion engine according to an embodiment.

Configuration of Internal Combustion Engine and Controller for Internal Combustion Engine FIG. 1 shows an internal combustion engine 10 mounted on a vehicle. The fuel of the internal combustion engine 10 is gaseous fuel. An example of a gaseous fuel is hydrogen gas.

The internal combustion engine 10 includes an engine body 11. The engine body 11 burns the fuel injected from the fuel injection valves 13 inside the respective cylinders to generate power for making the vehicle travel. In FIG. 1, cylinders, spark plugs, and the like are not shown.

The internal combustion engine 10 includes a fuel tank 12, fuel injection valves 13, a fuel passage 14, shut-off valves 15, and pressure sensors 16. The fuel tank 12 stores a gaseous fuel. Gaseous fuel is stored in the fuel tank 12 in a compressed state. Gaseous fuel is supplied from the fuel tank 12 to the fuel injection valves 13. The fuel injection valves 13 supply fuel into the cylinders.

The fuel passage 14 connects the fuel tank 12 and the fuel injection valves 13. The fuel passage 14 is constituted by a fuel pipe 17 connected to the fuel tank 12 and a delivery pipe 18 connecting the fuel pipe 17 and the fuel injection valves 13. The fuel stored in the fuel tank 12 is supplied to the fuel injection valves 13 via a fuel pipe 17 and a delivery pipe 18.

The shut-off valves 15 are disposed in the fuel passage 14. The shut-off valves 15 are, for example, electromagnetic valves. The shut-off valves 15 are switched between a valve open state and a valve closed state by the controller 100. When the shut-off valves 15 receive a valve opening command from the controller 100, the shut-off valves 15 are opened. When the shut-off valves 15 receive a valve closing command from the controller 100, the shut-off valves 15 are closed. Specifically, when a valve opening command is input from the controller 100 to the drive circuits of the shut-off valves 15, the drive circuits supply electric power to the shut-off valves 15. As a result, the shut-off valves 15 are opened. When a valve closing command is input from the controller 100 to the drive circuits of the shut-off valves 15, the drive circuits stop the supply of electric power to the shut-off valves 15. As a result, the shut-off valves 15 are closed. The shut-off valves 15 are maintained in an open state during operation of the internal combustion engine 10. The shut-off valves 15 are maintained in a closed state while the operation of the internal combustion engine 10 is in a stopped state. The shut-off valves 15 include a first shut-off valve 19 and a second shut-off valve 20.

The first shut-off valve 19 is disposed in the fuel passage 14 in the vicinity of the outlet of the fuel tank 12. The first shut-off valve 19 is disposed at an end portion of the fuel pipe 17 on the fuel tank 12 side. When the first shut-off valve 19 is in an open state, fuel is supplied from the fuel tank 12 to the fuel pipe 17. When the first shut-off valve 19 is in the closed state, the fuel supply from the fuel tank 12 to the fuel pipe 17 is stopped.

The second shut-off valve 20 is disposed downstream of the first shut-off valve 19 in the fuel passage 14. The second shut-off valve 20 is disposed in the vicinity of the delivery pipe 18. The second shut-off valve 20 is disposed between the fuel pipe 17 and the delivery pipe 18. When the second shut-off valve 20 is open, fuel is supplied from the fuel pipe 17 to the delivery pipe 18. When the second shut-off valve 20 is in the closed state, the fuel supply from the fuel pipe 17 to the delivery pipe 18 is stopped.

A pressure reducing valve 21 is disposed in the fuel passage 14 between the first shut-off valve 19 and the second shut-off valve 20. The pressure reducing valve 21 regulates the pressure of the fuel flowing into the delivery pipe 18 from the high-pressure fuel tank 12.

Each pressure sensor 16 is disposed in a portion of the fuel passage 14 between one of the shut-off valves 15 and the fuel injection valves 13. Each pressure sensor 16 detects a passage fuel pressure that is a pressure of the fuel in a portion between one of the shut-off valves 15 and the fuel injection valves 13. Each pressure sensor 16 outputs a detection signal regarding the detected passage fuel pressure to the controller 100.

The pressure sensors 16 include a first pressure sensor 23 and a second pressure sensor 24. The first pressure sensor 23 is arranged between the first shut-off valve 19 and the fuel injection valves 13 in the fuel passage 14. The first pressure sensor 23 is disposed between the first shut-off valve 19 and the second shut-off valve 20 in the fuel passage 14. The first pressure sensor 23 detects a first passage fuel pressure that indicates a passage fuel pressure between the first shut-off valve 19 and the fuel injection valves 13. The second pressure sensor 24 is arranged between the second shut-off valve 20 and the fuel injection valves 13. The second pressure sensor 24 detects a second passage fuel pressure that indicates a passage fuel pressure between the second shut-off valve 20 and the fuel injection valves 13.

The internal combustion engine 10 includes a temperature sensor 25. The temperature sensor 25 is disposed in a portion of the fuel passage 14 between the shut-off valve 15 and the fuel injection valves 13. The temperature sensor 25 detects a passage fuel temperature which is a temperature of the fuel in a portion between the shut-off valve 15 and the fuel injection valves 13. The temperature sensor 25 outputs a detection signal regarding the detected passage fuel temperature to the controller 100.

The temperature sensor 25 includes a first temperature sensor 26 and a second temperature sensor 27. The first temperature sensor 26 is disposed between the first shut-off valve 19 and the fuel injection valves 13. The first temperature sensor 26 is disposed between the first shut-off valve 19 and the second shut-off valve 20. The second temperature sensor 27 is arranged between the second shut-off valve 20 and the fuel injection valves 13.

The controller 100 performs various controls of the internal combustion engine 10 by controlling various control targets such as the fuel injection valves 13, the first shut-off valve 19, the second shut-off valve 20, and the pressure reducing valve 21. For example, the controller 100 drives the shut-off valve 15 to open by transmitting a valve opening signal to the shut-off valve 15, and drives the shut-off valve 15 to close by transmitting a valve closing signal to the shut-off valve 15.

The controller 100 includes a CPU 110 and a memory module 120 including a ROM, a RAM, and the like. When the CPU 110 executes the program stored in the memory module 120, various controls are performed by the controller 100.

The controller 100 acquires various values necessary for controlling the internal combustion engine 10. For example, the controller 100 acquires detection signals of the pressure sensors 16 and the temperature sensor 25. In addition, the controller 100 acquires detection signals of various sensors such as an accelerator operation amount sensor 200, a vehicle speed sensor 300, and an ignition sensor 400. The accelerator operation amount sensor 200 detects an accelerator opening degree that is an operation amount of an accelerator pedal operated by a user of the vehicle on which the internal combustion engine 10 is mounted. The vehicle speed sensor 300 detects a vehicle speed of the vehicle on which the internal combustion engine 10 is mounted. The controller 100 acquires a detection signal for calculating an engine rotation speed of the internal combustion engine 10, a detection signal of an intake air amount, and the like from the internal combustion engine 10.

Modification Related to Determination Process

The controller 100 outputs a valve closing signal to the shut-off valve 15. The controller 100 determines that the shut-off valve 15 is stuck open based on the amount of decrease in the passage fuel pressure that occurs until the elapsed period after the valve closing signal is output reaches a predetermined specified period. During execution of the determination process, the fuel injection valves 13 execute fuel injection. During execution of the determination process, fuel continues to be supplied from the fuel injection valves 13 into the cylinders. The controller 100 stores a determination result indicating that the shut-off valve 15 is stuck open in the memory module 120 when the amount of decrease in the passage fuel pressure that occurs until the elapsed period after the valve closing signal is output reaches a predetermined specified period is smaller than a specified threshold. The specified threshold is set, for example, based on the amount of fuel consumed during the idle operation of the internal combustion engine 10. The amount of fuel consumed during the idle operation of the internal combustion engine 10 is obtained based on the number of times of fuel injection performed during the idle operation, the injection time, and the passage fuel temperature.

The controller 100 may set the specified threshold in accordance with the passage fuel pressure, the passage fuel temperature, or the like at the start of the determination process. The controller 100 sets a higher specified threshold as the passage fuel temperature at the start of the determination process is higher.

The determination process includes a first determination process of determining whether the first shut-off valve 19 is stuck open and a second determination process of determining whether the second shut-off valve 20 is stuck open.

The first determination process will be described. During the execution of the first determination process, the second shut-off valve 20 is maintained in the open state.

When the first shut-off valve 19 is closed, the supply of fuel from the fuel tank 12 to the fuel passage 14 is stopped. Fuel is supplied from the fuel injection valves 13 into the cylinders by the fuel injection of the fuel injection valves 13, but if the first shut-off valve 19 is normally closed, the supply of fuel from the fuel tank 12 to the fuel passage 14 is stopped. Therefore, the first passage fuel pressure decreases during the execution of the first determination process. On the other hand, when the first shut-off valve 19 is stuck open, fuel continues to be supplied from the fuel tank 12 to the fuel passage 14. For this reason, the first passage fuel pressure does not decrease, or the amount of decrease in the first passage fuel pressure becomes smaller than when the first shut-off valve 19 is in the closed state. Therefore, it is possible to determine that the first shut-off valve 19 is stuck open based on the amount of decrease in the first passage fuel pressure.

The second determination process will be described. During the execution of the second determination process, the first shut-off valve 19 is preferably maintained in the closed state.

When the second shut-off valve 20 is in a closed state, fuel supply from the fuel pipe 17 to the delivery pipe 18 is stopped. Although the fuel is supplied from the fuel injection valves 13 into the cylinders by the fuel injection of the fuel injection valves 13, if the second shut-off valve 20 is normally closed, the fuel supply from the fuel pipe 17 to the delivery pipe 18 is stopped. Therefore, the second passage fuel pressure decreases during the execution of the second determination process. On the other hand, when the second shut-off valve 20 is stuck open, fuel continues to be supplied from the fuel pipe 17 to the delivery pipe 18. For this reason, the second passage fuel pressure does not decrease, or the amount of decrease in the second passage fuel pressure becomes smaller than when the second shut-off valve 20 is in the closed state. Therefore, it is possible to determine that the second shut-off valve 20 is stuck open based on the amount of decrease in the second passage fuel pressure.

The controller 100 executes the determination process when the stopping operation of the internal combustion engine 10 is executed. The stopping operation of the internal combustion engine 10 is, for example, turning off an ignition switch by a user of the vehicle. In a case in which the stopping operation of the internal combustion engine 10 is executed, the controller 100 starts the determination process and continues the operation of the internal combustion engine 10 until the determination process ends. When the stopping operation of the internal combustion engine 10 is executed, the controller 100 stops the internal combustion engine 10 after executing the determination process.

Determination Process During Fuel Cutoff Process

The controller 100 executes a fuel cutoff process for stopping fuel injection by the fuel injection valves 13 during operation of the internal combustion engine 10. The fuel cutoff process is executed when the accelerator pedal is not depressed and the engine rotation speed of the internal combustion engine 10 is greater than or equal to a specified value during the operation of the internal combustion engine 10. The fuel cutoff process ends when the accelerator pedal is depressed or when the engine rotation speed of the internal combustion engine 10 becomes less than the specified value. Execution of the fuel cutoff process improves the fuel efficiency of the internal combustion engine 10.

During the fuel cutoff process, the fuel injection by the fuel injection valves 13 is stopped, so the passage fuel pressure does not drop along with the fuel injection. Accordingly, if the determination process is executed while the fuel cutoff process is being executed, the passage fuel pressure does not decrease even if the shut-off valve 15 is not stuck open. Therefore, if the determination process is executed during execution of the fuel cutoff process, it may be erroneously determined that the shut-off valve 15 is stuck open even though the shut-off valve 15 is not stuck open.

The controller 100 does not refer to changes in the passage fuel pressure that occur during the execution of the fuel cutoff process in the determination process. Specifically, the controller 100 exclude the period in which the fuel cutoff process is executed from the elapsed period after the valve closing signal is output in the determination process. When the fuel cutoff process is being executed during the execution of the determination process, the controller 100 starts measuring the elapsed period from the end of the fuel cutoff process. When the determination process is started during the execution of the fuel cutoff process, the controller 100 starts measuring the elapsed period from the end of the fuel cutoff process.

Flow of Determination Process

Figure 2:
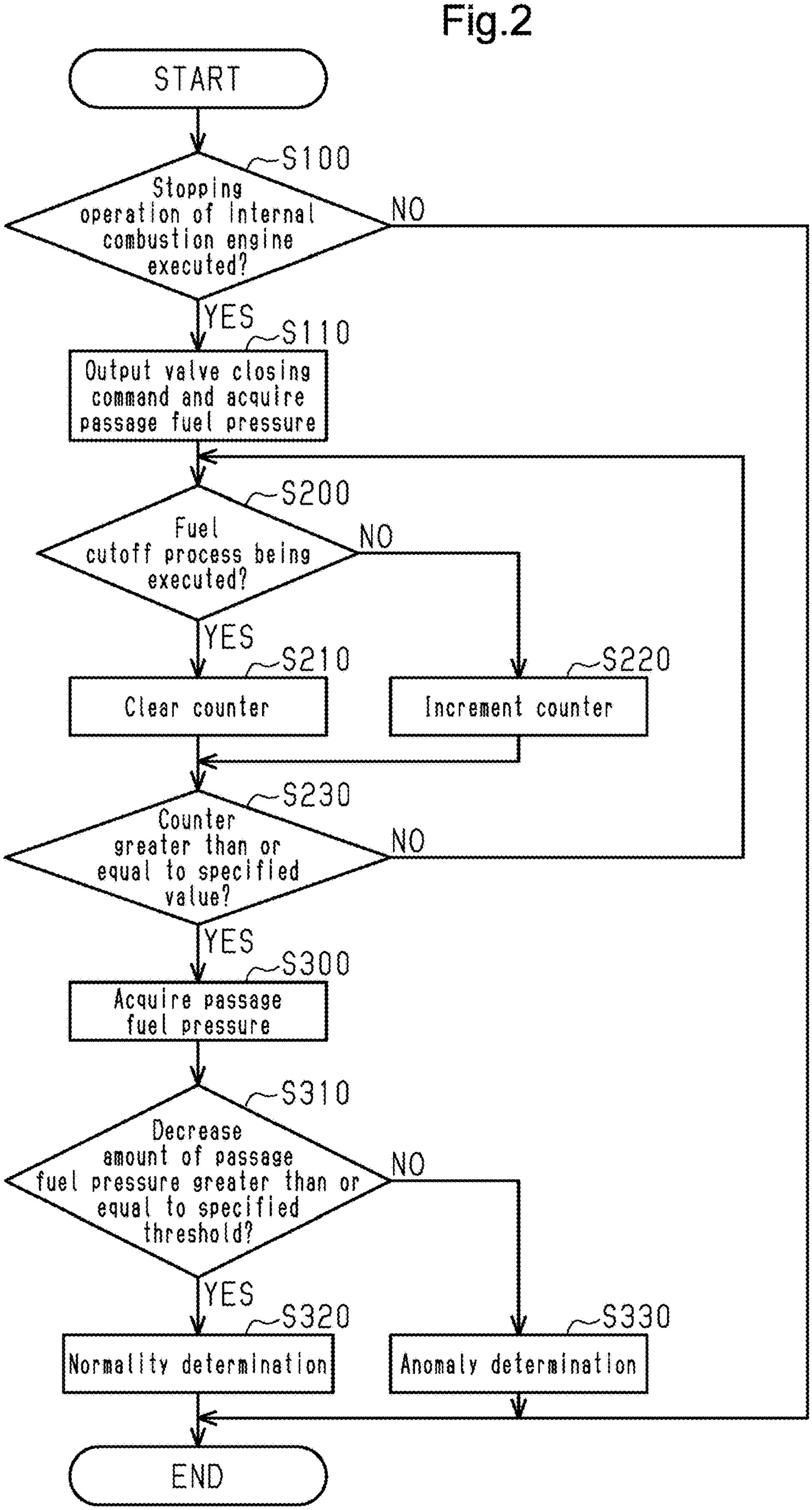
FIG. 2 is a flowchart showing a procedure of a determination process executed by the controller of the embodiment.

FIG. 2 shows a flow of a series of processes related to the determination process executed by the controller 100. The controller 100 repeatedly executes the process of FIG. 2. Both the first determination process and the second determination process are executed in accordance with the procedure shown in FIG. 2. The following describes a procedure in a case in which the first determination process is executed as the determination process in accordance with the procedure illustrated in FIG. 2. In the following process, the shut-off valve 15 is the first shut-off valve 19.

The controller 100 determines whether the stopping operation of the internal combustion engine 10 has been executed (S100). If the stopping operation of the internal combustion engine 10 has been executed (S100: YES), the controller 100 outputs the valve closing command to the shut-off valve 15, acquires the passage fuel pressure (S110), and proceeds to the process of S200. If the stopping operation of the internal combustion engine 10 has not been executed (S100: NO), the controller 100 ends the process of FIG. 2.

The controller 100 determines whether the fuel cutoff process is being executed in the internal combustion engine

10 (S200). If the fuel cutoff process is being executed in the internal combustion engine 10 (S200: YES), the controller 100 clears a counter (S210), and proceeds to the process of S230. If the fuel cutoff process is not being executed in the internal combustion engine 10 (S200: NO), the controller 100 increments the counter (S220), and proceeds to the process of S230. The counter measures an elapsed period after the valve closing signal is output in the S110. The counter is stored in the memory module 120 of the controller 100 in an updatable manner.

The controller 100 determines whether the counter is greater than or equal to a specified value (S230). The specified value of the counter is set to a period corresponding to the specified period. If the counter is greater than or equal to the specified value (S230: YES), the controller 100 proceeds to the process of S300. If the counter is less than the specified value (S230: NO), the controller 100 repeats a series of processes from S200.

The controller 100 acquires the passage fuel pressure (S300), and determines whether the decrease amount of the passage fuel pressure is greater than or equal to the specified threshold (S310). The decrease amount of the passage fuel pressure is a difference between the passage fuel pressure acquired in S110 and the passage fuel pressure acquired in S300. If the decrease amount of the passage fuel pressure is greater than or equal to the specified threshold (S310: YES), the controller 100 stores, in the memory module 120, a determination result indicating that the shut-off valve 15 is normal without being stuck open (S320), and ends the process of FIG. 2. If the amount of decrease in the passage fuel pressure is not greater than or equal to the specified threshold (S310: NO), the controller 100 stores, in the memory module 120, a determination result indicating an anomaly that the shut-off valve 15 is stuck open (S330), and ends the process of FIG. 2. The controller 100 may output the determination result indicating that the shut-off valve 15 is stuck open to a user of the vehicle or the like.

After the first determination process is executed as the series of processes of FIG. 2, the second determination process is executed in the same procedure as the series of processes of FIG. 2. When the second determination process is executed subsequent to the first determination process, the process of S100 is omitted from the series of processes of FIG. 2 in the second determination process.

Operation and Advantages of Present Embodiment (1) When measuring the elapsed period after the valve closing signal is output to the shut-off valve 15 in the determination process, the controller 100 exclude, from the elapsed period, the period in which the fuel cutoff process is executed. Therefore, it is possible to suppress the erroneous determination of the stuck-open state due to the execution of the fuel cutoff process.

(2) As an example, engine revving may be executed for the scavenging process during the stopping operation of the internal combustion engine 10. When engine revving is executed immediately before or immediately after the stopping operation of the internal combustion engine 10, the fuel cutoff process may be executed during the execution of the determination process. When the stopping operation of the internal combustion engine 10 is executed, the controller 100 described above executes the determination process while continuing the operation of the internal combustion engine 10. Accordingly, even if the determination process is started because the stopping operation of the internal combustion engine 10 is performed during the execution of the fuel cutoff process, erroneous determination is unlikely to occur in the determination process.

Modifications

The above-described embodiment may be modified as follows. The above-described embodiment and the following modifications can be combined as long as the combined modifications remain technically consistent with each other.

The internal combustion engine 10 may be configured to include only one of the first shut-off valve 19 and the second shut-off valve 20 as the shut-off valve.

When the controller 100 executes the determination process, only one of the first determination process and the second determination process may be executed as the determination process.

The determination process may be executed in a case other than the case in which the stopping operation of the internal combustion engine is executed. For example, the determination process may be executed while the vehicle is stopped.

The fuel cutoff process of the internal combustion engine 10 may be executed by a controller different from the controller 100. In this case, the controller 100 is configured to acquire a signal indicating that the fuel cutoff process is being executed from another controller.

When the fuel cutoff process is started during the execution of the determination process, the controller 100 may start the measurement of the elapsed period from the end of the fuel cutoff process. For example, when the fuel cutoff process is started during the execution of the determination process, the controller 100 clears the measurement result of the elapsed period up to that period, and restarts the measurement of the elapsed period from the end of the fuel cutoff process. In the determination process of the present modification, the decrease amount of the passage fuel pressure may be a decrease amount from the stopping operation of the internal combustion engine 10, or may be a decrease amount from when the measurement of the elapsed period is newly started from the end of the fuel cutoff process. In the latter case, for example, in S210 of FIG. 2, the counter may be cleared and the passage fuel pressure may be acquired.

In a case in which the fuel cutoff process is started during the execution of the determination process, the controller 100 may temporarily interrupt the measurement of the elapsed period and restart the measurement of the elapsed period from the end of the fuel cutoff process.

In the example of FIG. 2, a method of measuring the elapsed period by the counter is exemplified, but a method other than the counter may be adopted as long as the elapsed period can be measured. For example, the controller 100 may have a timer function of measuring the elapsed time instead of the counter. Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine mounted on a vehicle, the internal combustion engine including a fuel tank storing gaseous fuel, a fuel injection valve supplying the fuel into a cylinder, a fuel passage connecting the fuel tank to the fuel injection valve, a shut-off valve disposed in the fuel passage, and a pressure sensor disposed in a portion of the fuel passage between the shut-off valve and the fuel injection valve and configured to detect a passage fuel pressure that is a pressure of the fuel in the portion, the controller comprising processing circuitry, wherein the processing circuitry is configured to output a valve closing signal to the shut-off valve, execute a determination process of determining whether the shut-off valve is stuck open based on a decrease amount of the passage fuel pressure that occurs until an elapsed period after the valve closing signal is output reaches a predetermined specified period, and exclude, from the elapsed period, a period in which a fuel cutoff process for stopping fuel injection by the fuel injection valve during operation of the internal combustion engine is executed.

2. The controller for the internal combustion engine according to claim 1, wherein, when the determination process is started during execution of the fuel cutoff process, the processing circuitry starts measuring the elapsed period from an end of the fuel cutoff process.

3. The controller for the internal combustion engine according to claim 1, wherein, when the fuel cutoff process is started during execution of the determination process, the processing circuitry starts measuring the elapsed period from an end of the fuel cutoff process.

4. The controller for the internal combustion engine according to claim 1, wherein the processing circuitry starts the determination process in a case in which a stopping operation of the internal combustion engine is executed, and continues the operation of the internal combustion engine until the determination process ends.

* * * * *